US008995962B2

(12) United States Patent
Deng

(10) Patent No.: US 8,995,962 B2
(45) Date of Patent: Mar. 31, 2015

(54) INFORMATION NOTIFICATION METHOD AND WIRELESS HANDHELD DEVICE

(71) Applicant: Huawei Device Co., Ltd., Shenzhen (CN)

(72) Inventor: Junjie Deng, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 28 days.

(21) Appl. No.: 13/848,250

(22) Filed: Mar. 21, 2013

(65) Prior Publication Data
US 2013/0189959 A1 Jul. 25, 2013

Related U.S. Application Data

(63) Continuation of application No. PCT/CN2011/072656, filed on Apr. 12, 2011.

(51) Int. Cl.
H04M 1/725 (2006.01)
H04W 4/12 (2009.01)

(52) U.S. Cl.
CPC .................................. H04W 4/12 (2013.01)
USPC ................. 455/412.2; 455/567; 340/7.52

(58) Field of Classification Search
CPC ... H04W 68/00; H04W 68/05; H04M 19/047; H04M 1/575
USPC ............. 455/412.2, 418, 567; 340/870.02; 370/7.52
See application file for complete search history.

(56) References Cited

U.S. PATENT DOCUMENTS

2007/0293195 A1* 12/2007 Angwin et al. ............ 455/412.2
2008/0039152 A1* 2/2008 Arisawa ..................... 455/567
2008/0108343 A1* 5/2008 Kwak et al. ................ 455/418
(Continued)

FOREIGN PATENT DOCUMENTS

CN 101136876 3/2008
CN 101155052 4/2008
(Continued)

OTHER PUBLICATIONS

International Search Report, dated Jan. 19, 2012, in corresponding International Application No. PCT/CN2011/072656 (10 pp.).
(Continued)

Primary Examiner — Nathan Taylor
(74) Attorney, Agent, or Firm — Staas & Halsey LLP

(57) ABSTRACT

An information notification method is disclosed in this application. The method includes: receiving notification information sent by a sending end that indicates that unprocessed information exists, and the notification information is information carrying a vibration instruction (S101); obtaining a sending identifier in the notification information and searching for unprocessed information that has the sending identifier (S102); and When the unprocessed information is found, triggering a vibration motor according to the vibration instruction (S103). In the information notification method provided by the present invention, in a manner of sending an information vibration instruction to generate vibration at a receiving party, the receiving party is rapidly and effectively notificationed to view the unprocessed information, so that the information receiving party can process some significant information sent by a sending party in time.

10 Claims, 7 Drawing Sheets

(56) References Cited

U.S. PATENT DOCUMENTS

| | | | |
|---|---|---|---|
| 2009/0002127 A1* | 1/2009 | Kraft et al. | 340/7.52 |
| 2010/0080363 A1 | 4/2010 | Lesher et al. | |

FOREIGN PATENT DOCUMENTS

| | | |
|---|---|---|
| CN | 101188824 | 5/2008 |
| CN | 101237289 | 8/2008 |
| CN | 101282522 A | 10/2008 |
| CN | 101645959 A | 2/2010 |
| CN | 101883186 | 11/2010 |
| JP | 2005-150817 | 6/2005 |
| WO | WO 2005/064895 A1 | 7/2005 |
| WO | 2009/057257 | 5/2009 |

OTHER PUBLICATIONS

Form PCT/ISA/220, dated Jan. 19, 2012, in corresponding International Application No. PCT/CN2011/072656 (3 pp.).
Form PCT/ISA/237, dated Jan. 19, 2012, in corresponding International Application No. PCT/CN2011/072656 (4 pp.).
First Office Action, dated Jan. 5, 2013, in corresponding Chinese Application No. 201180000272.6 (30 pp.).
Extended European Search Report mailed Aug. 16, 2013 in corresponding European Application No. 11744267.3.
Chinese Office Action mailed Aug. 22, 2013 in corresponding Chinese Application No. 201180000272.6.

* cited by examiner

INFORMATION NOTIFICATION METHOD AND WIRELESS HANDHELD DEVICE

CROSS-REFERENCE TO RELATED APPLICATIONS

This application is a continuation of International Application No. PCT/CN2011/072656, filed on Apr. 12, 2011, which is hereby incorporated by reference in their entireties.

FIELD OF THE INVENTION

This application relates to the field of mobile communications, and in particular, to an information notification method and a wireless handheld device.

BACKGROUND OF THE INVENTION

With the popularization of mobile phone use, a mobile phone user receives lots of information or calls in daily life, but when the mobile phone user is in a certain particular environment, the mobile phone user cannot process the received information or calls in time.

For example, when the mobile phone user is in some occasions that require silence such as in a meeting or in a library, the mobile phone user adjusts the mobile phone to be a meeting mode or a silent mode, so the mobile phone user cannot sense the received information or call; or when the mobile phone user is on a bus or in some noisy environments, the decibel of a mobile phone ringtone is not high enough to make the mobile phone user notice that the mobile phone receives a short message or a call, thereby missing some important short messages or calls.

For senders who make the calls or sends the information, they cannot process some important things because the other side cannot answer the phone or reply short messages in time.

SUMMARY OF THE INVENTION

In order to solve the foregoing technical problems, embodiments of the present invention provide an information notification method and a wireless handheld device, which can effectively and timely give, to an information receiving party, a notification that unprocessed information needing to be processed exists.

In an aspect, provided is an information notification method, including:

receiving notification information sent by a sending end that indicates that unprocessed information exists, where the unprocessed information includes at least one type of the following information: a missed call, an unread short message, an unread e-mail, and unread information, and the notification information is information carrying a vibration instruction;

obtaining a sending identifier in the notification information and searching for unprocessed information that has the sending identifier; and when the unprocessed information is found, triggering a vibration motor according to the vibration instruction.

In another aspect, further provided is a wireless handheld device, including:

a vibration motor;

a radio frequency transceiver; and at least one processor, coupled to the vibration motor and the radio frequency transceiver, where the processor is configured to, at least based on notification information sent by a sending end and received by the radio frequency transceiver that indicates that unprocessed information exists, obtain a sending identifier in the notification information and search for unprocessed information that has the sending identifier, where the unprocessed information includes at least one type of the following information: a missed call, an unread short message, an unread e-mail, and unread information, and the notification information is information carrying a vibration instruction, and when the unprocessed information is found, trigger the vibration motor according to the vibration instruction.

In another aspect, further provided is an information notification method, including: when a preset condition is satisfied, sending notification information that indicates that unprocessed information exists to a receiving end, so that the receiving end receives the notification information, obtains a sending identifier in the notification information, and searches for unprocessed information that has the sending identifier, where the unprocessed information includes at least one type of the following information: a missed call, an unread short message, an unread e-mail, and unread information, and the notification information is information carrying a vibration instruction, and when the unprocessed information is found, triggers a vibration motor according to the vibration instruction.

In another aspect, further provided is a wireless handheld device, including:

a radio frequency transceiver; and at least one processor, coupled to the radio frequency transceiver, where the processor is configured to, when a preset condition is satisfied, invoke the radio frequency transceiver to send notification information that indicates that unprocessed information exists to a receiving end, so that the receiving end receives the notification information, obtains a sending identifier in the notification information, searches for unprocessed information that has the sending identifier, where the unprocessed information includes at least one type of the following information: a missed call, an unread short message, an unread e-mail, and unread information, and the notification information is information carrying a vibration instruction, and when the unprocessed information is found, triggers a vibration motor according to the vibration instruction.

In an information notification method and a wireless handheld device provided by the present invention, in a manner of sending notification information to generate vibration at a receiving party, the receiving party is rapidly and effectively notificationed to view unprocessed information, so that the information receiving party can process some significant information sent by a sending party in time.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings show merely some embodiments of the present invention, and persons of ordinary skill in the art may still derive other drawings from these accompanying drawings without creative efforts.

DETAILED DESCRIPTION OF THE EMBODIMENTS

To make the solutions of the present application more comprehensible for persons skilled in the art, the following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Embodiment 1

Figure 1:
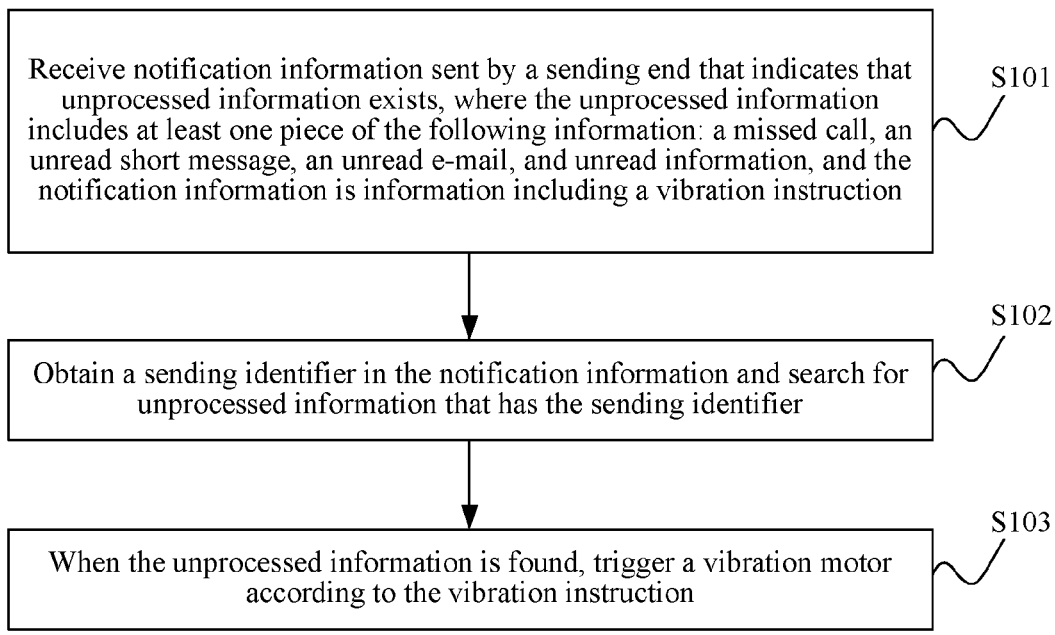
FIG. 1 is a flow chart of an information notification method according to Embodiment 1 of the present invention.

A processing flow chart of an information notification method provided by an embodiment of the present invention is shown in FIG. 1. The method includes the following steps:

Step S101: Receive notification information sent by a sending end that indicates that unprocessed information exists, where the unprocessed information includes at least one type of the following information: a missed call, an unread short message, an unread e-mail, and unread information, and the notification information is information carrying a vibration instruction.

The notification information that indicates that the unprocessed information exists is the information carrying the vibration instruction, where the vibration instruction is one of a program, a code, a digit combination or a letter combination that can invoke a vibration motor to generate vibration, the notification information is a carrier of the vibration instruction, and the carrier may be a short message, a multi-media message, QQ information, Fetion information or another form capable of transmitting information.

The unprocessed information may be at least one type of various information, such as a missed call, an unread short message, an unread e-mail, or unread information, where the unread information includes at least one type of the following information: microblog update information, QQ message leaving information, Fetion information or other instant messages.

Step S102: Obtain a sending identifier in the notification information and search for unprocessed information that has the sending identifier.

After the notification information sent by the sending end is received, an information sending identifier included in the notification information is obtained, and according to the information sending identifier, the unprocessed information corresponding to the notification information is searched for, namely, the unprocessed information that has the same information sending identifier is searched for.

If the unprocessed information is a missed call or an unread short message, the sending identifier in the sent notification information may be a mobile phone number in the missed call or the unread short message; and if the unprocessed information is a missed call, the sent notification information may be a short message, and the sending identifier is a mobile phone number.

Step S103: When the unprocessed information is found, trigger a vibration motor according to the vibration instruction.

When the unprocessed information corresponding to the notification information sent by the sending end is found, the vibration motor of a receiving end is invoked according to the vibration instruction included in the notification information to generate vibration.

It should be noted that, an execution subject of the foregoing method steps is a corresponding module or component inside a wireless handheld device that serves as the receiving end. The receiving end and the sending end involved in the embodiment of the present invention are wireless handheld devices. The wireless handheld device includes, but is not limited to, portable electronic devices with various systems, or portable electronic devices based on various operating systems, such as a smart phone or a non-smart phone, a personal digital assistant PDA, or a portable computer.

A program or software for triggering the vibration motor is stored inside the receiving end, and when the corresponding vibration instruction sent by the sending end is received and a corresponding preset condition is satisfied, the vibration motor may be triggered to generate vibration. Optionally, when no program or software for triggering the vibration motor is stored inside the receiving end, the wireless handheld device that serves as the sending end needs to send the receiving end a program, software, a code for triggering the vibration motor.

In the application of the information notification method provided by the embodiment of the present invention, when the sending end sends information to the receiving end, and within a certain time, the receiving end does not notice that the sending end sends the information because the receiving end is in a silent or meeting state, or when the receiving end cannot reply in time because of other things, the sending end sends notification information to the receiving end to search for unprocessed information corresponding to the notification information at the receiving end. When the unprocessed information is found, the vibration motor of the receiving end is triggered, and the notification that the unprocessed information needs to be processed is given to the receiving end, thereby enabling the unprocessed information to be processed in time.

Embodiment 2

Figure 2:
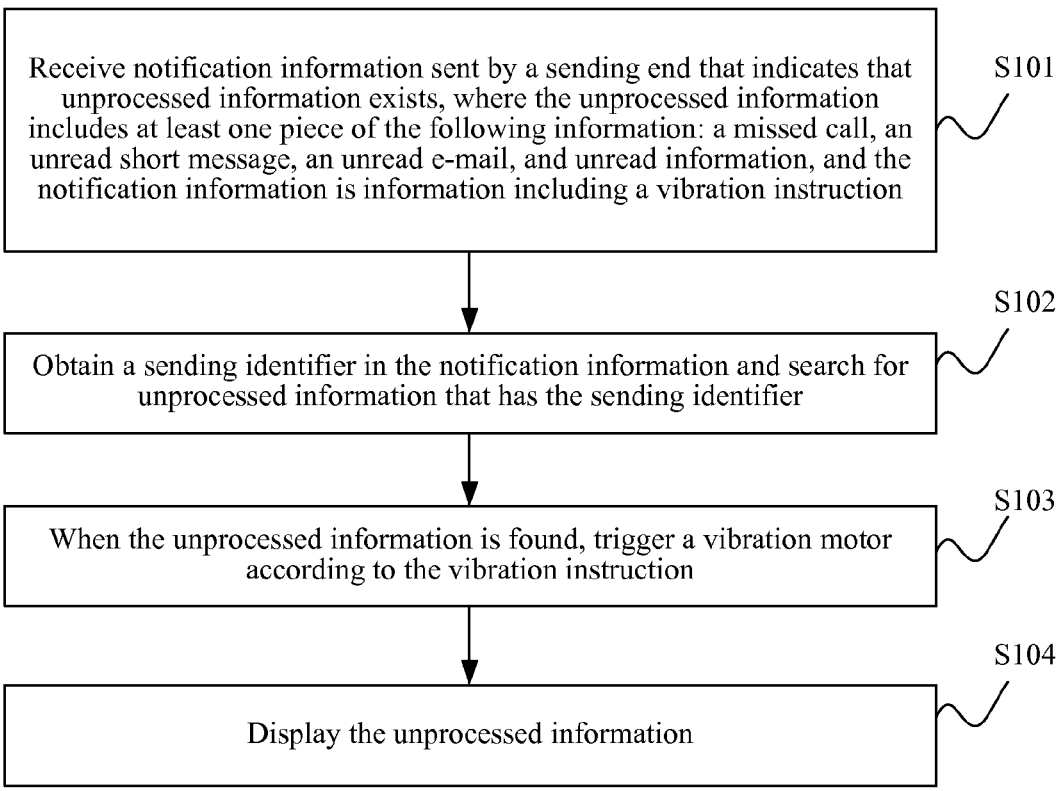
FIG. 2 is a flow chart of another information notification method according to Embodiment 2 of the present invention.

On the basis of the method shown in FIG. 1, when vibration is triggered according to the notification information and a user senses the vibration and views unprocessed information, optionally, the method further includes a process of displaying the unprocessed information. As shown in FIG. 2, the method includes the following steps:

Step 101 to step 103 are the same as that in Embodiment 1, which are not repeated again herein.

Step S104: Display the unprocessed information.

When the unprocessed information is found, the unprocessed information is displayed, so when noticing a vibration notification of a receiving end, a receiving end user can view the unprocessed information.

Figure 3:
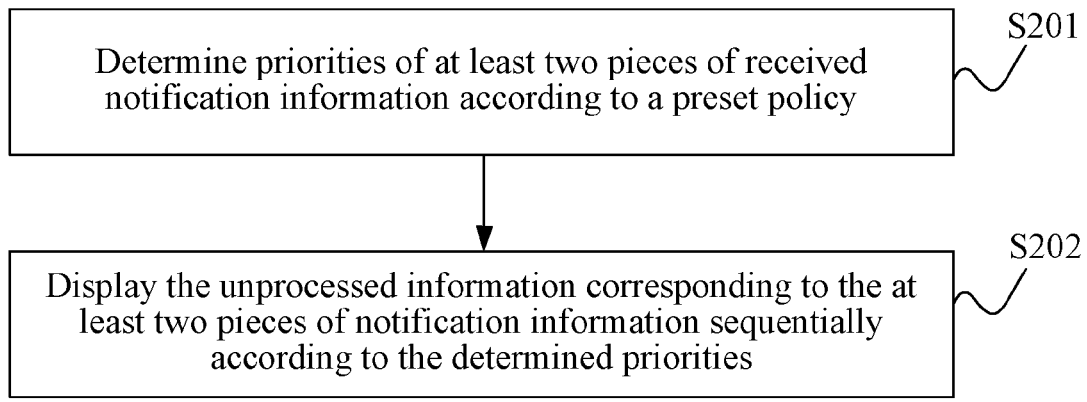
FIG. 3 is a flow chart of a method for displaying unprocessed information according to Embodiment 2 of the present invention.

In the execution process of the foregoing information notification method, when in a preset time period, at least two pieces of notification information are received and unprocessed information corresponding to the at least two pieces of notification information is found, the vibration motor is triggered only once. As shown in FIG. 3, the displaying the unprocessed information includes the following steps:

Step S201: Determine priorities of the at least two pieces of received notification information according to a preset policy.

Step S202: Display the unprocessed information corresponding to the at least two pieces of notification information sequentially according to the determined priorities.

It can be known from the method shown in FIG. 3 that the information notification method provided by the embodiment of the present invention supports receiving, in a preset time period, multiple pieces of different notification information sent by different sending ends. At this time, the vibration motor of the receiving end may be triggered to vibrate only once, thereby reducing the electric energy loss of a battery of the receiving end. It should be noted that, the preset time period may be adjusted by a user as required. For example, a certain time period is set to be 20 seconds after receiving a first piece of notification information. The unprocessed information corresponding to the multiple pieces of different notification information is displayed according to the determined priorities.

It should be noted that, optionally, an alternative solution for step S201 to S202 is: performing the display according to a time order of receiving the vibration instructions of the multiple pieces of different notification information.

Figure 4:
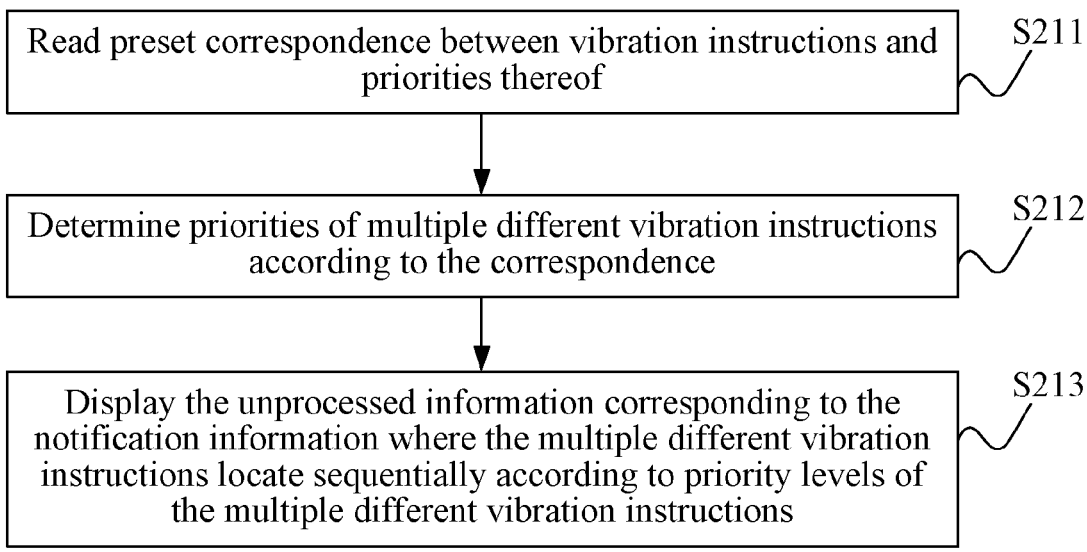
FIG. 4 is a flow chart of another method for displaying unprocessed information according to Embodiment 2 of the present invention.

As shown in FIG. 4, the specific steps of displaying the unprocessed information according to the priorities of the vibration instructions include the following steps:

Step S211: Read preset correspondence between vibration instructions and priorities of the vibration instructions.

In a certain time period, multiple pieces of different notification information sent by multiple different sending ends may be received, namely, multiple different vibration instructions sent by the multiple different sending ends are received. When the unprocessed information is displayed after the user is notificationed according to the vibration generated by the multiple different vibration instructions, the unprocessed information may be displayed according to the priority levels of the multiple different vibration instructions, so the processing priorities of the received multiple different vibration instructions need to be preset. The setting of the priorities is to determine a processing order of the multiple different vibration instructions and a display order of the unprocessed information corresponding to the vibration instruction.

The correspondence between the vibration instructions and the priorities of the vibration instructions is preset at the receiving end. In the process of setting the correspondence, the user may perform setting according to an actual application process. For example, the user may set the priorities of the vibration instructions according to a receiving order of the multiple different vibration instructions, and the setting manner may be that the priority of the first received vibration instruction is highest or define that the priority of the last received vibration instruction is highest.

When the priority of the first received vibration instruction is set to be highest, the priorities of the multiple different vibration instructions decrease in ascending order from the first received vibration instruction to the last received vibration instruction.

When the priority of the last received vibration instruction is set to be the highest, the priorities of the multiple different vibration instructions increase in descending order from the first received vibration instruction to the last received vibration instruction.

The user may further set some particular priorities on the basis of the priority setting in the foregoing order. For example, the user sets a priority of a certain sending end to be highest, and no matter when the sending end sends the vibration instruction, the priority of the vibration instruction is the highest priority, and the unprocessed information corresponding to the vibration instruction sent by the sending end is displayed first.

Step S212: Determine the priorities of the multiple different vibration instructions according to the correspondence.

After the multiple different vibration instructions are received, the priorities of the multiple different vibration instructions are searched for in the preset priority correspondence.

Step S213: Display the unprocessed information corresponding to the notification information where the multiple different vibration instructions locate in descending order according to the priority levels of the multiple different vibration instructions.

In the foregoing process of setting the priority, the vibration instructions in the multiple pieces of notification information are received in a certain time period when the user does not notice the unprocessed information. It should be noted that, the foregoing certain time period may be preset. For example, the certain time period is set to be 20 seconds after receiving the first piece of notification information. If in the time period, the multiple vibration instructions are received at the same time point of the time period, it is first determined whether a vibration instruction corresponding to a special priority preset by the user exists in the multiple vibration instructions, for example, vibration instructions set by the user that are sent by some important sending ends. When the vibration instruction set by the user that is sent by the important sending end exists, the unprocessed information corresponding to the vibration instructions sent by the important sending end is displayed preferentially, and the unprocessed information corresponding to other vibration instructions is displayed in a random manner. When no vibration instruction sent by the important sending end set by the user exists, the unprocessed information corresponding to the multiple different vibration instructions received at the same time point is displayed in a random manner.

Embodiment 3

Figure 5:
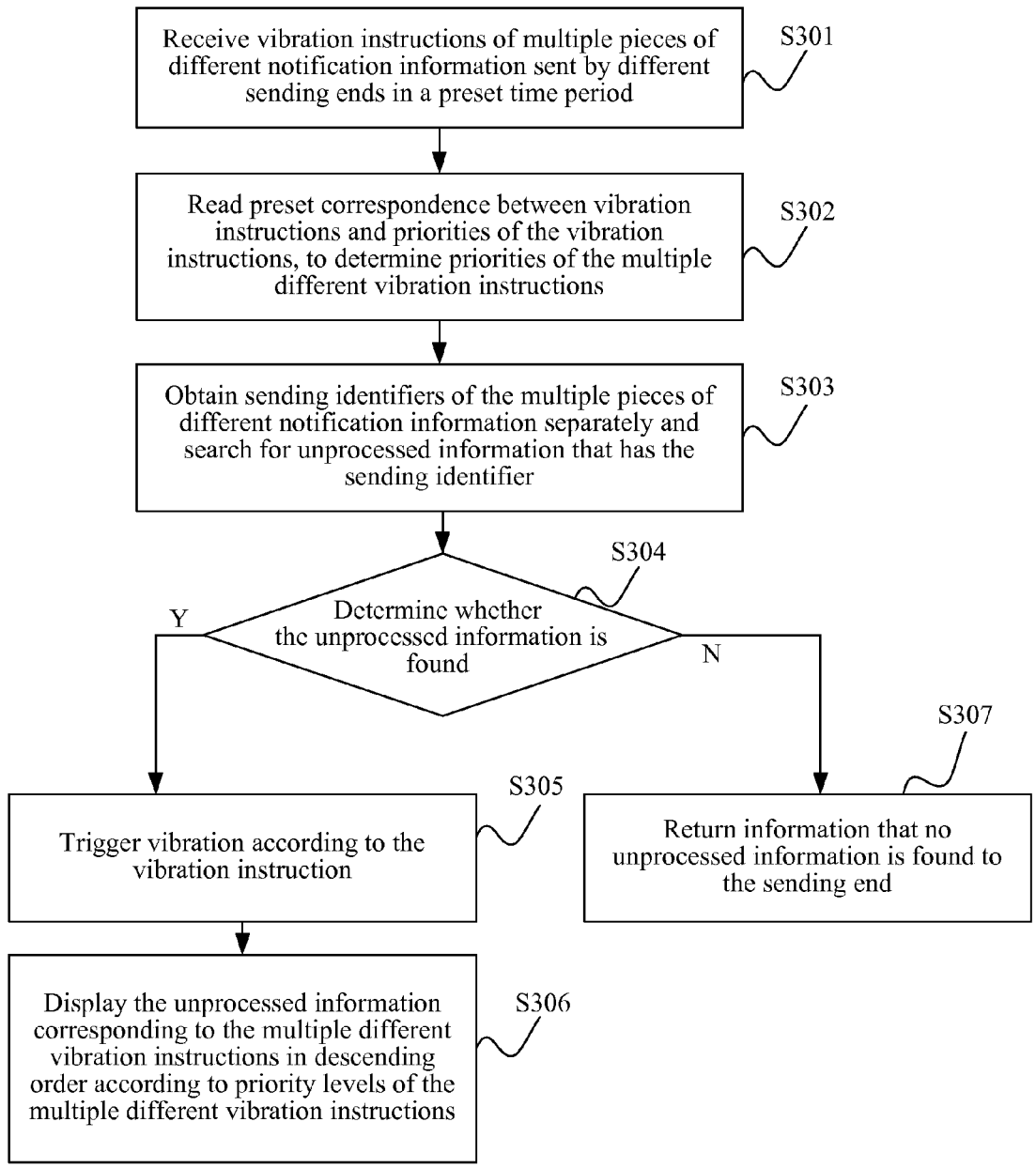
FIG. 5 is a flow chart of another information notification method according to Embodiment 3 of the present invention.

Another information notification method is provided by an embodiment of the present invention. As shown in FIG. 5, the method includes the following steps:

Step S301: In a preset time period, receive vibration instructions of multiple pieces of different notification information sent by different sending ends.

It should be noted that, the preset time period may be adjusted by a user as required. For example, a certain time period is set to be 20 seconds after receiving the first piece of notification information. After the vibration instructions of the multiple pieces of different notification information are received in the preset time period, a vibration motor of a receiving end may be triggered to vibrate only once, thereby reducing the electric energy loss of a battery of the receiving end.

Step S302: Read preset correspondence between vibration instructions and priorities of the vibration instructions, to determine priorities of the multiple different vibration instructions.

Step S303: Obtain sending identifiers of the multiple pieces of different notification information and search for unprocessed information that has the sending identifier.

Step S304: Determine whether the unprocessed information is found; if yes, execute step S305; and otherwise, execute step S307.

Step S305: Trigger a vibration motor according to the vibration instruction.

Step S306: Display the unprocessed information corresponding to the multiple different vibration instructions in descending order according to priority levels of the multiple different vibration instructions.

Step S307: Send information that no unprocessed information is found to the sending end.

The information that no unprocessed information is found is not limited, and may be a paragraph of words or letters or digits, for example, "no unprocessed information corresponding to the vibration instruction is found". A specific sending form is not limited, such as a short message, an instant message, or an e-mail.

In the execution process of the foregoing steps, the processes of determining the priorities of the multiple different vibration instructions and searching for the unprocessed information corresponding to the vibration instructions are not limited. Meanwhile, at the receiving end of the user, if no unprocessed information corresponding to the notification information where the vibration instructions sent by the sending end locate exists, vibration cannot be generated according to the vibration instruction, and meanwhile information that no unprocessed information is found is sent to the sending end. Meanwhile, if the user already views the unprocessed information corresponding to the notification information where the vibration instructions sent by the sending end locate, but because of some reasons, no processing is performed on the unprocessed information, so no notification information is sent to the sending end when the sending end sends the notification information again.

Embodiment 4

An embodiment of the present invention provides a wireless handheld device. The schematic structural diagram of the wireless handheld device is shown in FIG. 6 and includes:

a vibration motor 401, a radio frequency transceiver 402, and at least one processor 403, where the processor 403 is coupled to the vibration motor 401 and the radio frequency transceiver 402; and the processor 403 is configured to, at least based on notification information sent by a sending end and received by the radio frequency transceiver 402 that indicates that unprocessed information exists, obtain a sending identifier in the notification information, and search for unprocessed information that has the sending identifier, where the unprocessed information includes at least one type of the following information: a missed call, an unread short message, an unread e-mail, and unread information, and the notification information is information carrying a vibration instruction, and when the unprocessed information is found, trigger the vibration motor 401 according to the vibration notification instruction.

Figure 6:
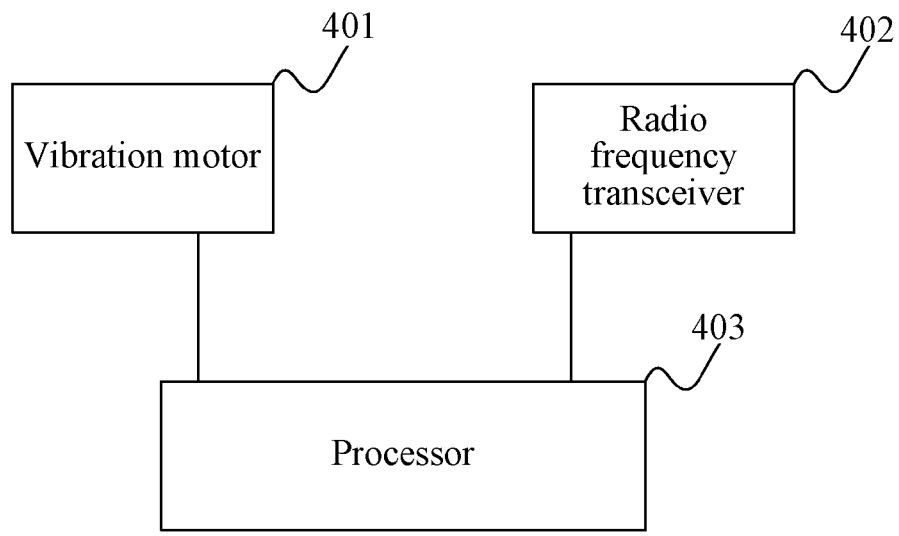
FIG. 6 is a schematic structural diagram of a wireless handheld device according to Embodiment 4 of the present invention.
Figure 7:
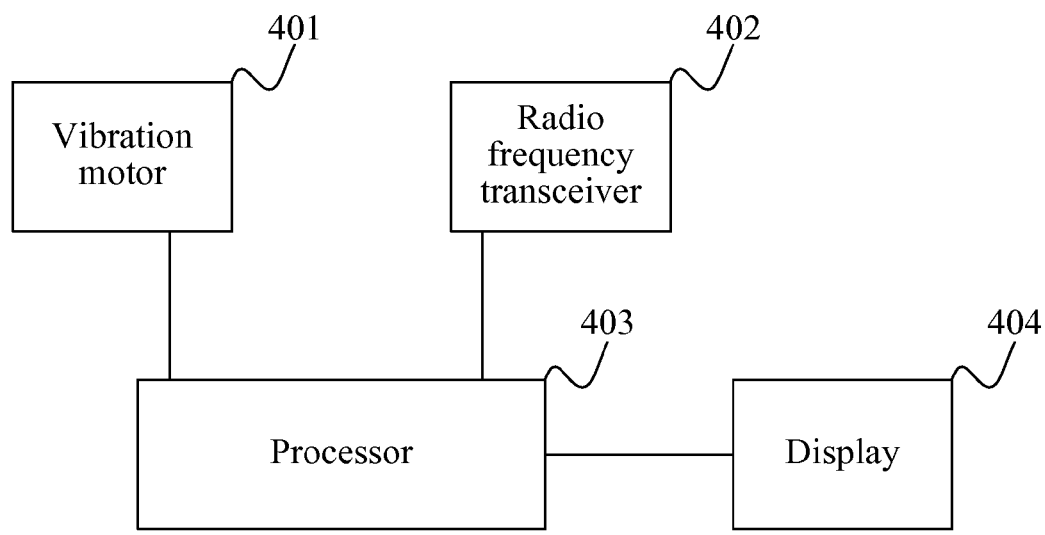
FIG. 7 is a schematic structural diagram of another wireless handheld device according to Embodiment 4 of the present invention.

On the basis of the wireless handheld device shown in FIG. 6, another schematic structural diagram of the wireless handheld device provided by an embodiment of the present invention is shown in FIG. 7, and the wireless handheld device further includes:

a display 404 coupled to the processor 403, where the display 404 is configured to display the unprocessed information after the vibration motor 401 vibrates.

Furthermore, in the wireless handheld device provided by the embodiment of the present invention, the processor 403 is configured to, when the radio frequency transceiver receives at least two pieces of notification information in a preset time period and finds unprocessed information corresponding to the at least two pieces of notification information in the preset time period, trigger the vibration motor 401 only once, and configured to determine priorities of the at least two pieces of received notification information according to a preset policy, and the display 404 is configured to display the unprocessed information corresponding to the at least two pieces of notification information sequentially according to the priorities determined by the processor 403.

Figure 8:
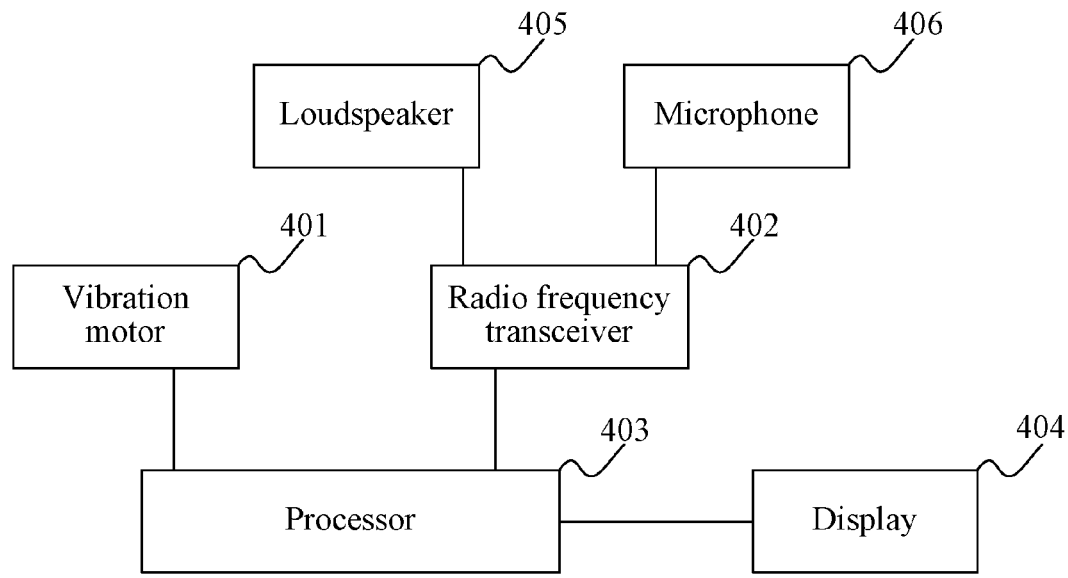
FIG. 8 is a schematic structural diagram of another wireless handheld device according to Embodiment 4 of the present invention.

Optionally, as shown in FIG. 8, the wireless handheld device provided by the embodiment of the present invention further includes:

a loudspeaker 405 coupled to the radio frequency transceiver 402; and a microphone 406 coupled to the radio frequency transceiver 402, where the radio frequency transceiver 402 is further configured to, when no unprocessed information that has the sending identifier is found by the processor 403, send information that no unprocessed information is found to the sending end.

In the wireless handheld device provided by the embodiment of the present invention, after the vibration motor is triggered to generate vibration to prompt a user, if the user already views the unprocessed information corresponding to the notification information, but in the case that no processing is performed, if the sending end still sends the notification information, the radio frequency transceiver no longer sends the notification information to the sending end.

Embodiment 5

Figure 9:
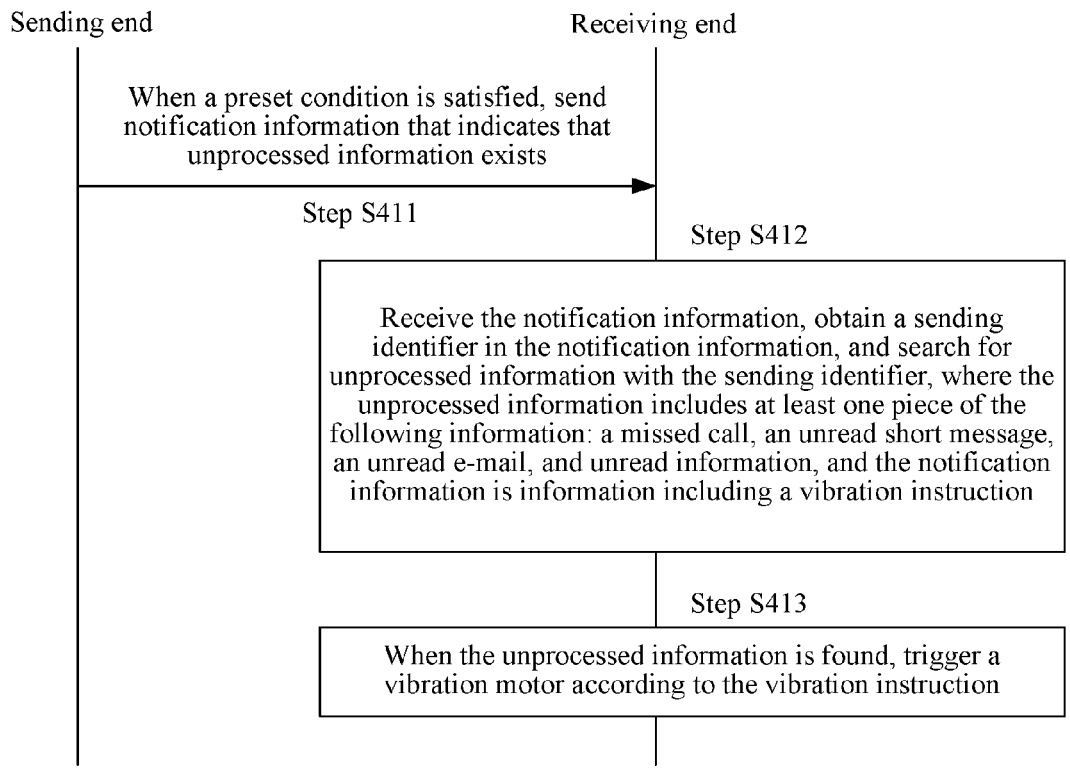
FIG. 9 is a flow chart of an information notification method according to Embodiment 5 of the present invention.

As shown in FIG. 9, an embodiment of the present invention provides an information notification method, including the following steps:

Step S411: When a preset condition is satisfied, send notification information that indicates that unprocessed information exists to a receiving end.

The preset condition may be as follows: A user configures and selects to send the notification information that indicates that the unprocessed information exists; or a time counted after a call is made to the receiving end and is not connected exceeds a preset time; or a time counted after information is sent to the receiving end exceeds a preset time.

When the foregoing preset condition is satisfied, the notification information that indicates that the unprocessed information exists is sent to the receiving end.

The receiving end executes step S412 and step S413.

Step S412: Receive the notification information, obtain a sending identifier in the notification information, and search for unprocessed information that has the sending identifier, where the unprocessed information includes at least one type of the following information: a missed call, an unread short message, an unread e-mail, and unread information, and the notification information is information carrying a vibration instruction.

Step S413: When the unprocessed information is found, trigger a vibration motor according to the vibration instruction.

In the foregoing preset condition, that the user configures and selects to send the notification information that indicates that the unprocessed information exists is as follows: after the user sends information or calls a receiving end user, in the case that the receiving end user does not respond, the sending end may automatically configure and select to send the notification information that indicates that the unprocessed information exists to the receiving end, or the user configures and selects to send, at the sending end, the notification information that indicates that the unprocessed information exists to the receiving end, thereby triggering vibration at the receiving end to prompt the user.

Figure 10:
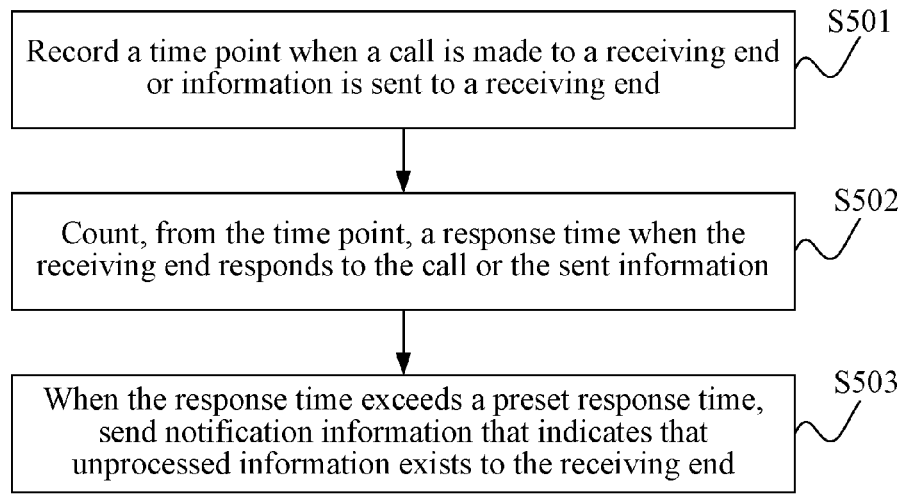
FIG. 10 is a flow chart of a method for sending notification information automatically according to Embodiment 5 of the present invention.

In the foregoing preset condition, when the time counted after a call is made to the receiving end and is not connected exceeds the preset time and the time counted after information is sent to the receiving end exceeds the preset time, a schematic flow chart of a processing process of automatically sending, at the sending end, notification information to the receiving end is shown in FIG. 10, and the processing process includes the following steps:

Step S501: Record a time point when a call is made to a receiving end or information is sent to a receiving end.

Step S502: Count, from the time point, a response time when the receiving end responds to the call or the sent information.

Step S503: When the response time exceeds a preset response time, send notification information that indicates that unprocessed information exists to the receiving end.

It should be noted that, an execution subject of the foregoing step is a corresponding device or module of the wireless handheld device that serves as the sending end. The preset response time may be set randomly by a user according to an actual situation. For example, the time counting is started from a starting time point of the call or the sent information, and when a time period exceeds the preset response time, the vibration instruction is sent to the receiving end.

Figure 11:
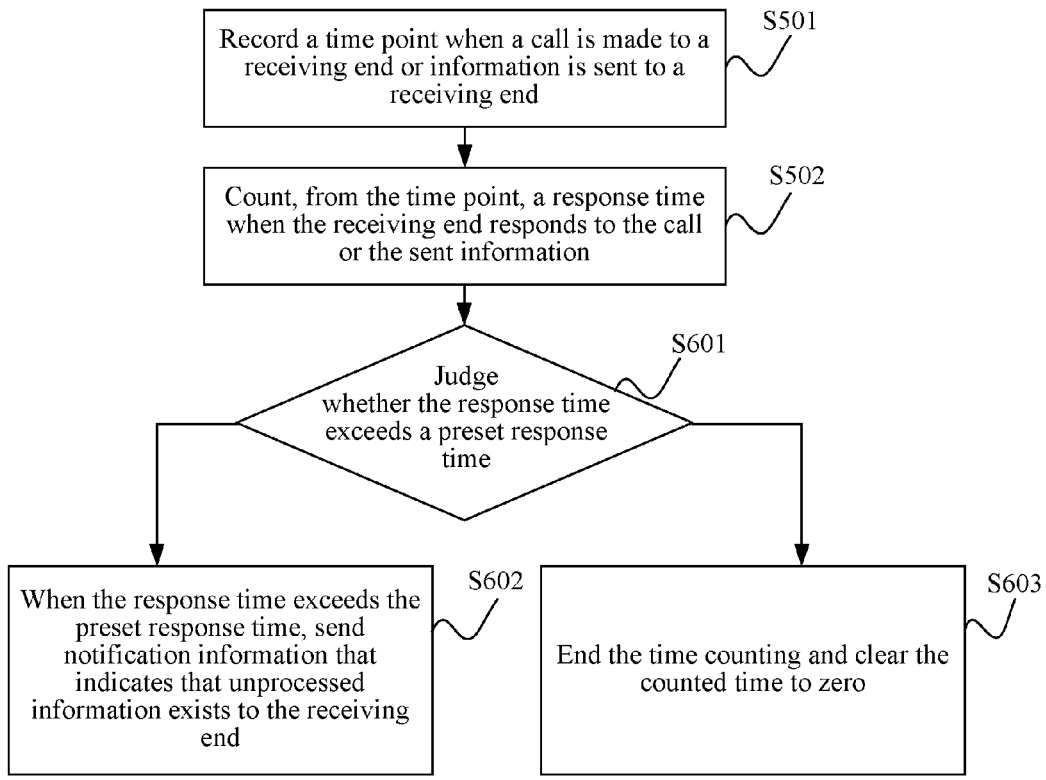
FIG. 11 is a flow chart of another method for sending notification information automatically according to Embodiment 5 of the present invention.

When the time when the receiving end responds to the call or the sent information does not exceed the preset response time, the time counting ends, and the recorded time is cleared to zero, where a specific implementation process is shown in FIG. 11. FIG. 11 is a flow chart of an information notification method provided by an embodiment of the present invention.

It should be noted that, a user may also select to manually send the notification information to the receiving end.

When the wireless handheld device is a mobile phone, if a mobile phone that serves as the sending end sends information or makes a call to a mobile phone that serves as a receiving end, and the mobile phone that serves as the receiving end does not respond in a certain time, the mobile phone that serves as the sending end may send, through the wireless handheld device, the notification information that indicates that the unprocessed information exists to the mobile phone that serves as the receiving end. A carrier of the notification information may be a short message, a multi-media message or other instant information. For example, when a short message is sent, a mobile phone short message sending interface is entered, a vibration instruction is selected to be added in a sending option, to add the vibration instruction to the short message, and the short message including the vibration instruction is sent to the mobile phone that serves as the receiving end through the wireless handheld device.

After the mobile phone that serves as the receiving end receives the notification information sent by the mobile phone that serves as the sending end, the wireless handheld device disposed in the mobile phone that serves as the receiving end reads the vibration instruction in the notification information, and in the case of finding the unprocessed information needing to be processed, invokes, according to the vibration instruction, a vibration motor of the mobile phone that serves as the receiving end to generate vibration to prompt the user.

If the carrier of the notification information is a multi-media message, QQ information or other instant information, the operation processing process thereof is consistent with the operation processing process of the short message.

Embodiment 6

Figure 12:
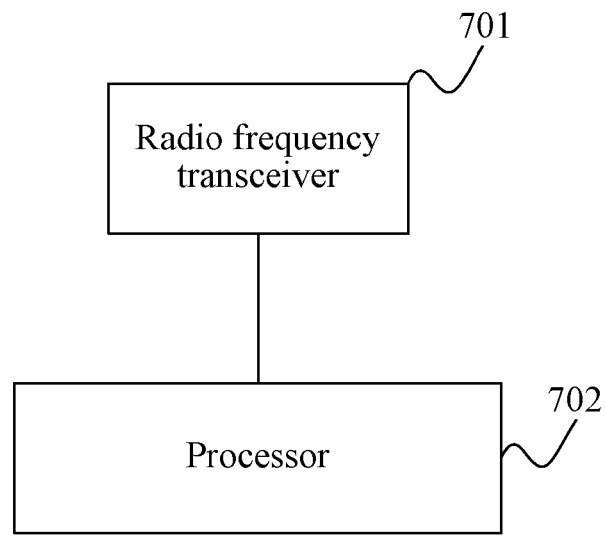
FIG. 12 is a schematic structural diagram of a wireless handheld device according to Embodiment 6 of the present invention.

An embodiment of the present invention provides a wireless handheld device, and a schematic structural diagram of the wireless handheld device is shown in FIG. 12. The wireless handheld device includes:

a radio frequency transceiver 701; and at least one processor 702, coupled to the radio frequency transceiver 701, where the processor 702 is configured to, when a preset condition is satisfied, invoke the radio frequency transceiver 701 to send notification information that indicates that unprocessed information exists to a receiving end, so that the receiving end receives the notification information, obtains a sending identifier in the notification information, searches for unprocessed information that has the sending identifier, where the unprocessed information includes at least one type of the following information: a missed call, an unread short message, an unread e-mail, and unread information, the notification information is information carrying a vibration instruction, and when the unprocessed information is found, triggers a vibration motor according to the vibration instruction.

Figure 13:
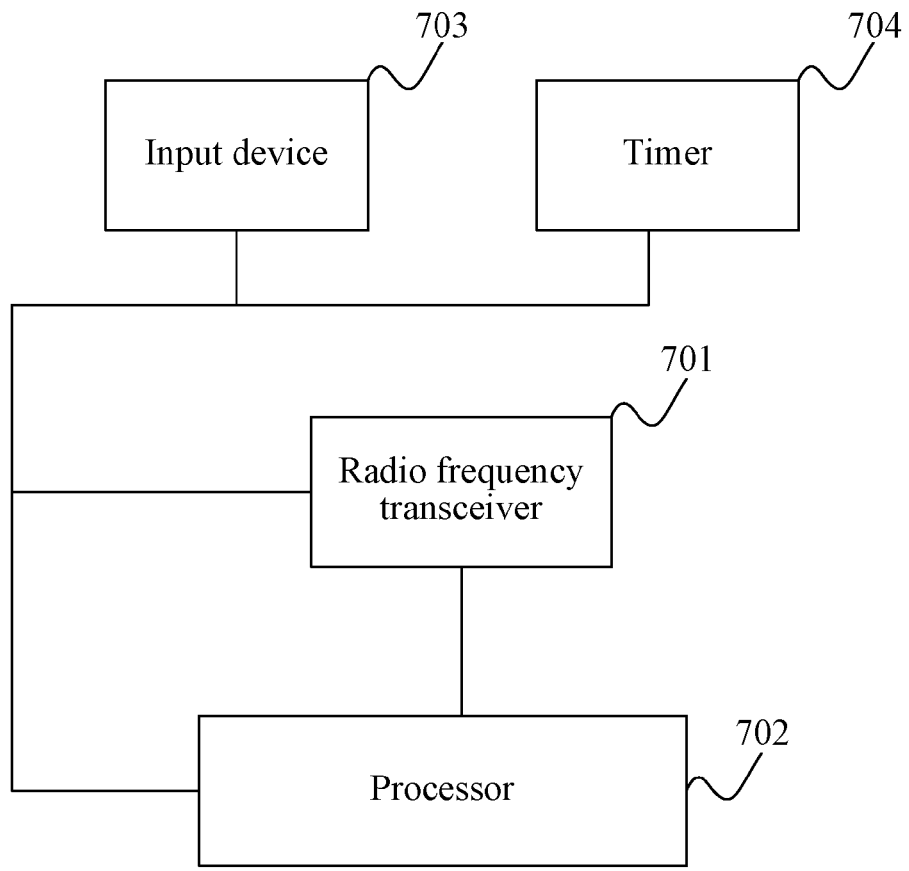
FIG. 13 is a schematic structural diagram of another wireless handheld device according to Embodiment 6 of the present invention.

Optionally, as shown in FIG. 13, the foregoing wireless handheld device further includes: an input device 703 coupled to the processor 702 and the radio frequency transceiver 701; and a timer 704 coupled to the processor 702 and the radio frequency transceiver 701, where the preset condition includes that:

the input device 703 senses that a user configures and selects to send the notification information that indicates that the unprocessed information exists;

or, a time counted by the timer 704 after the radio frequency transceiver 701 makes a call to the receiving end and is not connected exceeds a preset time;

or, a time counted by the timer 704 after the radio frequency transceiver 701 sends information to the receiving end exceeds a preset time.

The foregoing device embodiments basically correspond to the method embodiments, so the description is simple, and reference may be made to part of the illustration of the method embodiments for relevant places.

The embodiments in this specification are all described in a progressive manner, mutual reference may be made to the same or similar part of the embodiments, and each embodiment focuses on illustrate difference from other embodiments. The foregoing descriptions are merely specific implementation manners of this application. It should be noted that, several improvements and modifications may be further made by persons of ordinary skill in the art without departing from the principle of this application, and the improvements and modifications should also be construed as falling within the protection scope of this application.

What is claimed is:

1. An information notification method, comprising:
receiving notification information, from a sending end, when determining information sent to a receiving end remains unprocessed at the receiving end, the information remaining unprocessed indicating at least one of a missed call, an unread short message, an unread e-mail, and unread information, and the notification information is information comprising a vibration instruction;
obtaining a sending identifier in the notification information and searching for information sent that remains unprocessed that has the sending identifier; and
triggering a vibration motor of the receiving end according to the vibration instruction when the sending identifier is found as a result of the searching.

2. The method according to claim 1, wherein after the triggering the vibration motor according to the vibration instruction, the method further comprises:
displaying the information that remains unprocessed.

3. The method according to claim 2, wherein when at least two pieces of notification information are received in a preset time period and information that remains unprocessed corresponding to the at least two pieces of notification information is found in the preset time period, the vibration motor is triggered only once, and the displaying the information that remains unprocessed comprises:
determining priorities of the at least two pieces of received notification information according to a preset policy; and
displaying the information that remains unprocessed corresponding to the at least two pieces of notification information sequentially according to the determined priorities.

4. The method according to claim 1, wherein after the obtaining the sending identifier in the notification information and searching for the information sent that remains unprocessed that has the sending identifier, the method further comprises:
when no unprocessed information that has the sending identifier is found, sending information that no unprocessed information is found to the sending end.

5. A wireless handheld device, comprising:
a vibration motor of a receiving end;
a radio frequency transceiver; and
at least one processor, coupled to the vibration motor and the radio frequency transceiver,
wherein the processor is configured to, at least based on notification information sent to the radio frequency transceiver from a sending end when determining information sent to the receiving end remains unprocessed at the receiving end, obtain a sending identifier in the notification information and search for information sent that remains unprocessed that has the sending identifier,
wherein the information that remains unprocessed indicates at least one a missed call, an unread short message, an unread e-mail, and unread information, and the notification information is information carrying a vibration instruction, and the vibration motor of the receiving end is triggered according to the vibration instruction when the sending identifier is found as a result of the search.

6. The wireless handheld device according to claim 5, further comprising:
a display coupled to the processor, wherein the display is configured to display the information that remains unprocessed after the vibration motor vibrates.

7. The wireless handheld device according to claim 6, wherein the processor is configured to, when the radio frequency transceiver receives at least two pieces of notification information in a preset time period and finds information that remains unprocessed corresponding to the at least two pieces of notification information in the preset time period, trigger the vibration motor only once, and configured to determine priorities of the at least two pieces of received notification information according to a preset policy, and
the display is configured to display the information that remains unprocessed corresponding to the at least two pieces of notification information sequentially according to the priorities determined by the processor.

8. The wireless handheld device according to claim 5, further comprising:
a loudspeaker coupled to the radio frequency transceiver; and
a microphone coupled to the radio frequency transceiver, wherein
the radio frequency transceiver is configured to, when no unprocessed information that has the sending identifier is found by the processor, send information that no unprocessed information is found to the sending end.

9. An information notification method, comprising:
sending notification information, from a sending end to a receiving end, when determining information sent to the receiving end remains unprocessed at the receiving end and when determining a preset condition is satisfied, so that the receiving end receives the notification information, obtains a sending identifier in the notification information, searches for information sent that remains unprocessed that has the sending identifier,
wherein the information that remains unprocessed indicates at least one of a missed call, an unread short message, an unread e-mail, and unread information, and the notification information is information carrying a vibration instruction, and a vibration motor of the receiving end is triggered according to the vibration instruction when the sending identifier is found as a result of the search.

10. The method according to claim 9, wherein the preset condition comprises that:
a user configures and selects to send the notification information that indicates that the information that remains unprocessed;
or,
a time counted after a call is made to the receiving end and is not connected exceeds a preset time;
or,
a time counted after information is sent to the receiving end exceeds a preset time.

* * * * *